June 14, 1960 P. R. ADAMS ET AL 2,940,318
GYROSCOPES, GYROSCOPE STABILIZED SYSTEMS AND
GAS BEARINGS FOR THE SAME
Filed June 3, 1957 9 Sheets-Sheet 1
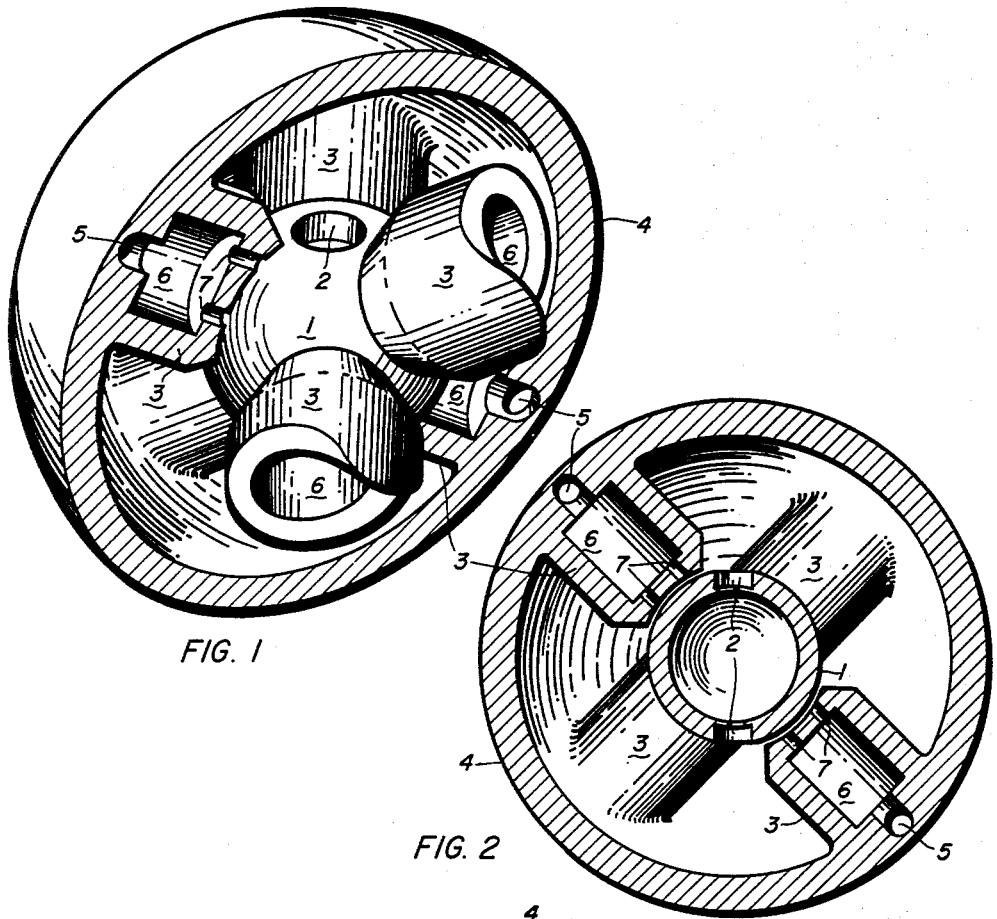
FIG. 1
FIG. 2
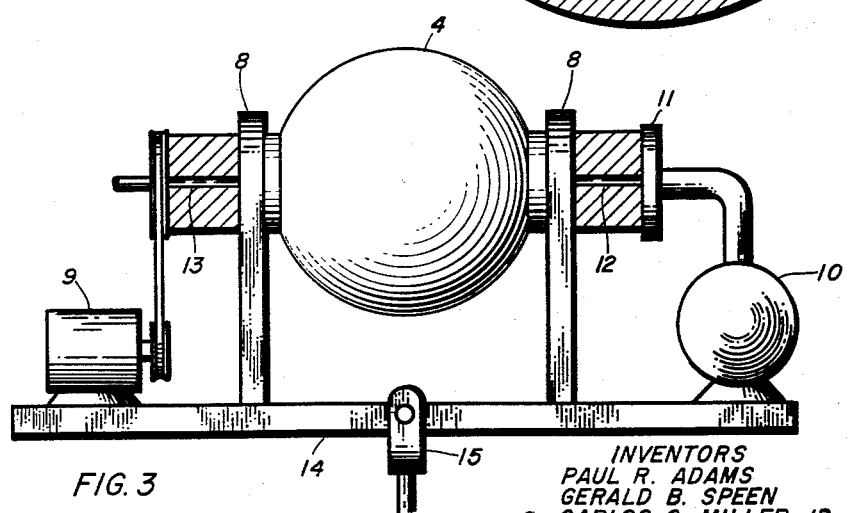
FIG. 3
INVENTORS
PAUL R. ADAMS
GERALD B. SPEEN
CARLOS C. MILLER, JR.
BY *Percy V. Landry* ATTORNEY June 14, 1960 P. R. ADAMS ET AL 2,940,318
GYROSCOPES, GYROSCOPE STABILIZED SYSTEMS AND
GAS BEARINGS FOR THE SAME
Filed June 3, 1957 9 Sheets-Sheet 2

INVENTORS
PAUL R. ADAMS
GERALD B. SPEEN
CARLOS C. MILLER, JR.

BY

*Lucy P. Landry*

ATTORNEY

INVENTORS
PAUL R. ADAMS
GERALD B. SPEEN
CARLOS C. MILLER, JR.

BY

ATTORNEY

June 14, 1960 P. R. ADAMS ET AL 2,940,318
GYROSCOPES, GYROSCOPE STABILIZED SYSTEMS AND
GAS BEARINGS FOR THE SAME
Filed June 3, 1957 9 Sheets-Sheet 4

INVENTORS
PAUL R. ADAMS
GERALD B. SPEEN
CARLOS C. MILLER, JR.

BY
ATTORNEY

June 14, 1960 P. R. ADAMS ET AL 2,940,318
GYROSCOPES, GYROSCOPE STABILIZED SYSTEMS AND
GAS BEARINGS FOR THE SAME
Filed June 3, 1957 9 Sheets-Sheet 5

INVENTORS
PAUL R. ADAMS
GERALD B. SPEEN
CARLOS C. MILLER, JR.
BY
ATTORNEY

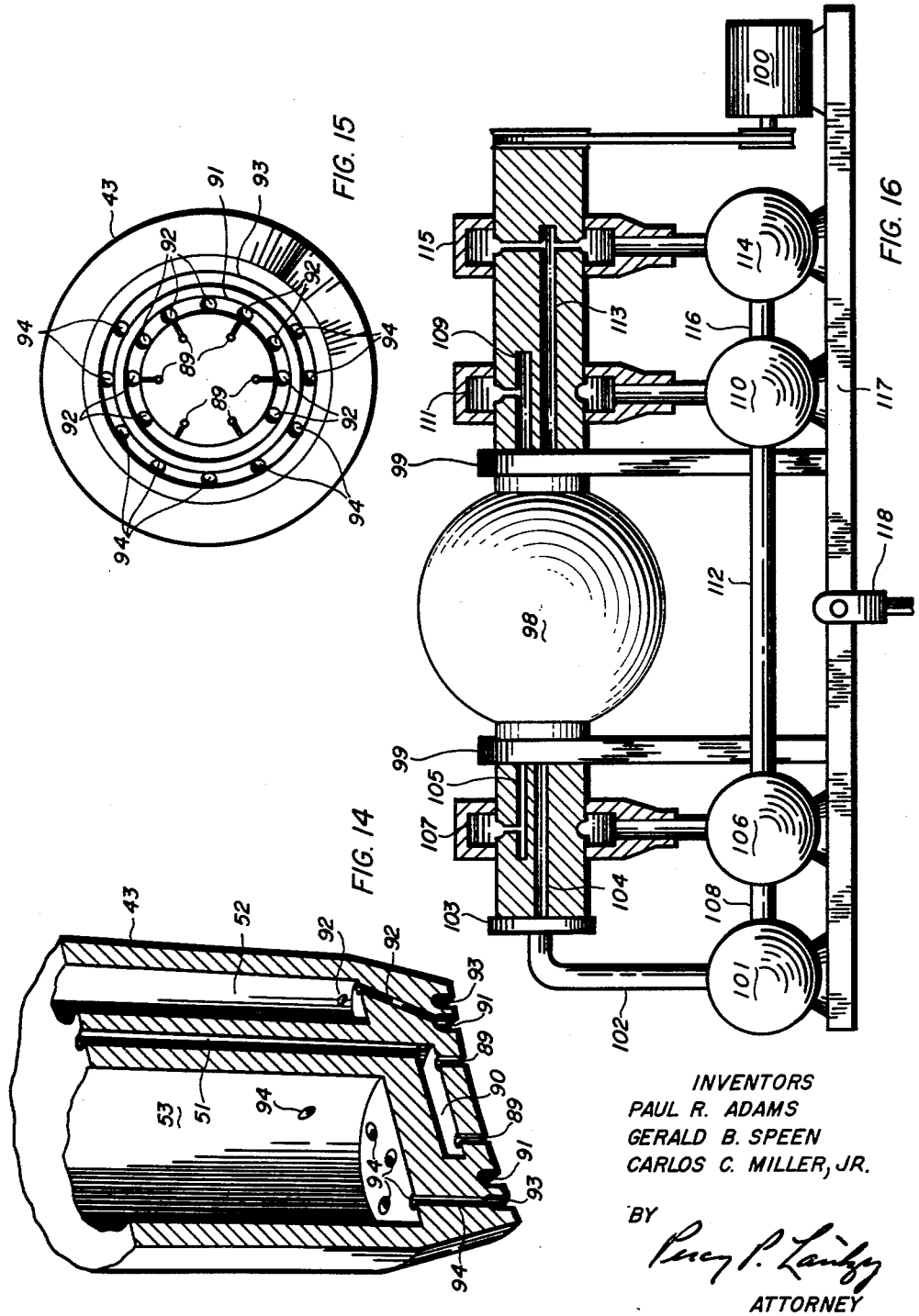

INVENTORS
PAUL R. ADAMS
GERALD B. SPEEN
CARLOS C. MILLER, JR.

BY

ATTORNEY

INVENTORS
PAUL R. ADAMS
GERALD B. SPEEN
CARLOS C. MILLER, JR.

BY

ATTORNEY

INVENTORS
PAUL R. ADAMS
GERALD B. SPEEN
CARLOS C. MILLER, JR.

BY

ATTORNEY

United States Patent Office 2,940,318
Patented June 14, 1960

2,940,318

GYROSCOPES, GYROSCOPE STABILIZED SYSTEMS AND GAS BEARINGS FOR THE SAME

Paul Riemann Adams, Northridge, Gerald Bruce Speen, Sepulveda, and Carlos C. Miller, Jr., Northridge, Calif., assignors to International Telephone and Telegraph Corporation, Nutley, N.J., a corporation of Maryland Filed June 3, 1957, Ser. No. 663,290

22 Claims. (Cl. 74—5)

The present invention relates to highly accurate, low drift gyroscopes, and, in particular, to what may be called the "boot-strap" type of gyroscope (any type whose drift decreases nearly to zero if the main frame thereof is maintained in nearly perfect alignment with the rotor axis). This invention also relates to a boot-strap system incorporating such a gyroscope and arranged to continually maintain such nearly perfect alignment. This invention also relates to a novel form of spherical gas bearing useful in such a gyroscope.

One of the principal objects of the present invention is to provide a "rotor swiveling arrangement" which makes use of gas bearings in order to take advantage of the very low static friction characteristic of such gas bearings, and which at the same time avoids the errors ordinarily resulting from the "bias torque" or unbalanced steady state torque which generally characterizes such bearings. (By "rotor swiveling arrangement" is meant broadly any supporting means—whether in the form of conventional gimbals or an internal Hooke's Joint, or any other form—which supports the rotor from the main frame while still permitting at least two degrees of freedom of tilt of the rotor axis with respect to the main frame.)

Another object of the invention is to provide such a gas bearing type of rotor-swiveling-arrangement, while at the same time arranging means for maintaining a moderate degree of vacuum around those parts which undergo relative motion as a result of the swiveling action, thereby greatly reducing the gaseous damping of the swiveling action.

It is a further and important object of the present invention to provide a gyroscope which shall have a gas bearing type of rotor-swiveling-arrangement, together with means for balancing out permanent or steady state torques of the gas bearings contained therein, and which shall in addition have a configuration of the external motor type, suitable for completely avoiding the dissipation of heat in the rotor or the associated rotor swiveling arrangement. It is still a further object to produce such a gyroscope which shall be either completely or approximately isoelastic.

It is a further object to produce a gyroscope whose drift rate shall decrease almost without limit as the angle between the rotor axis and the corresponding axis of the gyroscope main frame is reduced toward zero, thus making it possible to achieve almost limitless system accuracy merely by providing a sufficiently perfect platform alignment system to maintain the platform in alignment with the gyroscope rotor to an extremely high degree of precision.

It is another object of the invention to provide a gyroscope of the external motor type which shall be comparable in accuracy (or even in some embodiments superior in accuracy) to the single-degree-of-freedom gyroscopes using jeweled or hydraulic gimbal bearings with flotation to reduce the load on such bearings.

Another object of this invention is to provide a design which inherently lends itself to completely or approximately isoelastic configurations so that this source of difficulty can be minimized.

Another very significant object of this invention is to provide a new gas bearing design which is particularly suited for use in the gyroscope under consideration. This unique bearing uses a spherical member supported by four or more separate bearing pads or feeds so as to provide three complete degrees of rotational freedom. Such a bearing is also uniquely characterized by self-servoing action in all bearing pads and by complete isolation of each pad from the pressure variations in adjacent pads.

A still further object of this invention is to apply such a central spherical gas bearing to a gyroscope in such a way as to obtain an extremely high accuracy gyroscope.

An even higher accuracy gyroscope using the same principles as those described above, but with the addition of one of several methods of evacuating the gas from the rotor case when necessary is a further object of this invention.

A still further object of this invention is to provide a highly accurate two-degree-of-freedom platform using a single gas bearing gyroscope as herein described, principally by the addition of a very rapid, precise servo follow-up.

A similar platform highly accurate in three degrees of freedom using two gas bearing gyroscopes as herein described and a very rapid, precise servo follow-up system is another object of this invention.

It has become generally recognized in recent years that air bearings (or gas bearings using hydrogen, nitrogen, helium, or other gases) exhibit an essentially zero value of stiction (i.e., static friction), and a very low coefficient of viscous friction. Many suggestions of employing gas bearings either in the spin bearings or in the gimbal bearings of gyroscopes have therefore been made. For producing extremely high performance in extremely low drift gyroscopes, however, these attempts to employ gas bearings have heretofore proved unsuccessful for two reasons. In the first place, the gas bearing, although exhibiting zero stiction and low coefficient of viscous friction, has the fault of producing a small, but continuous, torque or bias force in one direction. For use in a gyroscope gimbal bearing, this type of continuous force is even worse than large viscous frictional coefficients. In the second place, actual measurements on the various types of low drift gyroscopes show that in the truly high grade, low drift gyroscopes now employed in inertial systems, the major errors are not caused by friction in the gimbal bearings but rather by anisoelastic effects and by the thermal effects resulting from the heating of the motor and the spin bearings.

In accordance with the present invention, we propose to produce a gyroscope whose rotor swiveling arrangement makes use of gas bearings, but wherein this swiveling arrangement is itself rotated so as to continually transpose the direction of the steady state torque of the gas bearings, thus neutralizing the effects thereof in respect to gyroscope drift. Although it is within the scope of our invention to perform such transposing or rotation at a rate considerably lower than the spin rate of the gyroscope, we propose in all the preferred forms of our invention to perform the transposition in synchronism with the spin rate of the rotor, thus simplifying the structure, reducing the total number of degrees of freedom required for achieving both spin and transposition, eliminating the troublesome effects caused by the inertia of intermediate swiveling members, and finally resulting in a structure which achieves all these useful results, while at the same time enabling the motor to be located wholly outside the main gyroscope structure, so as to avoid the thermal warping due to the heat of the motor.

This invention resides substantially in the combination, construction, arrangement, relative location of parts, and steps as described in detail herein. Many peculiarities and characteristics of this invention make their appearance in this disclosure, and the many examples of execution given solely as examples in this disclosure should not in any way be construed as limiting the scope of this invention to such diagrammatic instances, and the general overall purpose as stated in the claims of this invention should be considered as the scope of this invention.

Other objects of this invention will become apparent from the appended claims or from the following description taken in connection with the accompanying drawings wherein:

Figures 1 and 2 are perspective and sectional views respectively of a gas bearing gyroscope using a simple spherical rotor and six gas bearing pads.

Figure 3 is a schematic diagram of a gyroscope stabilized system using a gyroscope such as that in Figures 1 and 2, wherein no evacuation of gas is provided.

Figure 14 is a sectioned perspective of a double evacuation ring type of gas bearing pad such as that used in the unit shown in Figure 9.

Figure 15 is an end view of one type of double evacuation ring type of bearing pad showing one possible feed-hole arrangement.

Figure 16 is a schematic diagram of a gyroscope stabilized system wherein the gyroscope uses double evacuation ring type bearing pads such as that shown in Figure 14 whose intermediates frame is a gastight case which is also evacuated.

Figure 4:
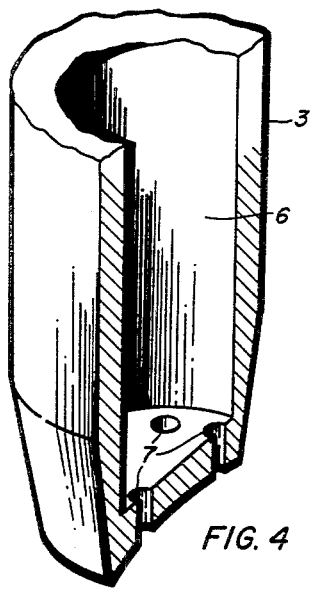
Figure 4 is a sectioned perspective of one simple type of gas bearing pad such as that used in the unit in Figures 2 and 5.

Referring to Figures 1, 2, and 4, the rotor 1 is a spherical structure wherein two cylindrical cavities 2 are provided, one at each end of the sphere, thus giving it a predetermined preferred axis of rotation about which its moment of inertia is maximum. The rotor 1, which is preferably made of some highly stable material such as quartz or some very high density material and preferably hollow to obtain optimum angular momentum for the mass used, has a very accurately spherical external form and a very high quality exterior finish so that it can act as a bearing surface cooperating with the accurate spherical end surfaces of the gas bearing pads 3. The six gas bearing pads 3, which are of hollow cylindrical from as shown in Figure 4, extend inward as shown in Figures 1 and 2 from the inside of intermediate frame 4, so that their surfaces match with the surface on the rotor sphere 1. These bearing pads 3 are disposed along three orthogonal axes. Three of them are integral with one half of the intermediate frame 4 and the other three are integral with the other half of this frame. All gas being conducted and distributed throughout this frame to the six pads by a system of manifolding 5. The bearing surfaces are made as large as possible for maximum load carrying ability but some space is left between adjacent pads in order to prevent interaction. Gas, supplied through the manifolding 5 to the reservoirs 6 within the bearing pads 3, is fed through six almost microscopic feed holes to 7 to the bearing surfaces where support of the sphere is accomplished.

The surfaces of the circular cavities 2 are used for any convenient type of sensitive pick-off system (not shown), such as capacitive or photo-electric, as well as to predetermine the preferred axis of rotation for the rotor 1.

The intermediate frame 4 is mounted in mechanical bearings 8 as shown schematically in Figure 3 and spun by some external driving mechanism 9 such as an electric motor or gas turbine system. It is obvious that the friction in these bearings 8 will have no effect on the accuracy of the instrument. If the intermediate frame 4 were suddenly spun in this manner, while the rotor 1 was supported on the gas bearings, the rotor 1 would be left far behind and a very long period of time would elapse before the extremely low gas bearing friction could bring rotor 1 up to the speed of the frame 4. In the usual practical case, it is desirable to bring the rotor 1 up to operating speed almost immediately. This may be accomplished through the use of a suitable caging mechanism (not shown) which secures the rotor sphere 1 to the intermediate frame 4 during both the spin-up period and also the slow-down period. When the desired operating speed is reached, the caging mechanism releases the rotor 1 which is then supported only on the gas bearings. Once the rotor 1 and intermediate frame 4 are moving together, they will continue to do so as to result of the minute bearing frictions and "windage" effects since the gas within the unit is also rotating with the parts. The pump, or high pressure gas source 10 supplies gas through a rotating joint or gas slip ring mechanism 11 into the rotating gyroscope assembly. The gas is conducted through the passage 12 into the manifolding system 5 for conduction to the gas bearing pads 3. An exhaust passage 13 is provided for the disposal of excess gas or the gas may be returned to the high pressure source for recirculation. This complete assembly is mounted on a platform 14 or within an enclosure and is gimballed through the necessary gimballing system 15, so that the necessary number of degrees of freedom is obtained. Conventional torquers (not shown) are provided at junction between gimbals and between gimbal and platform, as necessary.

The very precise and accurate pick-off arrangement (not shown) which is provided between the rotor 1 and the intermediate frame 4 detects any deviation in position between these two units resulting from some motion of the vehicle carrying the system. The signals thus obtained are carried to a high response servo system, to be described later, which converts these signals into the necessary electrical impulses which are applied to the proper torquers in the gimballing system 15 so as to always maintain the intermediate frame 4 in line with the rotor 1 and keep the pick-off readings at null. These sensitive pick-offs, must precisely determine any deviations in the alignment of the rotor 1 with respect to the intermediate frame 4 about all axes except the axis of rotation, with respect to which relative position, is unimportant.

Although Figures 1 and 2 depict the gyroscope as having six bearing pads 3, which form three mutually perpendicular axes, thus obtaining equal support in all directions, it should be noted that any number of bearing pads 3 may be used as long as three-axis translational restraint is provided. (For a gyroscope which must withstand apparent-g forces in any direction this requires four or more pads.) For optimum isoelasticity one may choose 4, 6, 8, 12, or 20 pads of identical size and shape arranged in line with the centers of the faces of the five well known regular polyhedrons. This gives theoretically ideal isoelasticity if the intermediate frame is essentially rigid.

It should also be noted that the rotational velocities of the rotor and the intermediate frame need not be identical and, as a matter of fact, in some cases it might be useful to have them rotating at different velocities. It is obvious that it is simplest and easiest to have the two rotate at the same velocity, since then the process of bringing the rotor up to speed requires only a simple caging mechanism, whereas if the rotor is to be spun at a higher velocity, some supplementary means of spin-up must be provided in addition to the caging mechanism. The usefulness of an extra high speed rotor is obvious, however, when consideration is given to an application such as a ballistic missile, where the greatest precision is required for only a short period during the initial part of its flight. If the rotor is initially spun up, by some additional technique such as magnetic induction, to a much higher velocity than that of the intermediate frame and allowed to coast, it will very gradually slow down by itself toward the speed of the intermediate frame as a result of the minute frictions existing in the air bearings. This process can take a considerable length of time and during this period much lower drift rates can be expected since drift decreases with increased angular momentum and therefore angular velocity. Finally, when the speed of the rotor equals that of the intermediate frame, the two will continue to rotate at the same velocity and the normal drift rate of the gyroscope will be apparent from then on. Thus extra low drift rates can be obtained during the initial period of operation.

Figure 5:
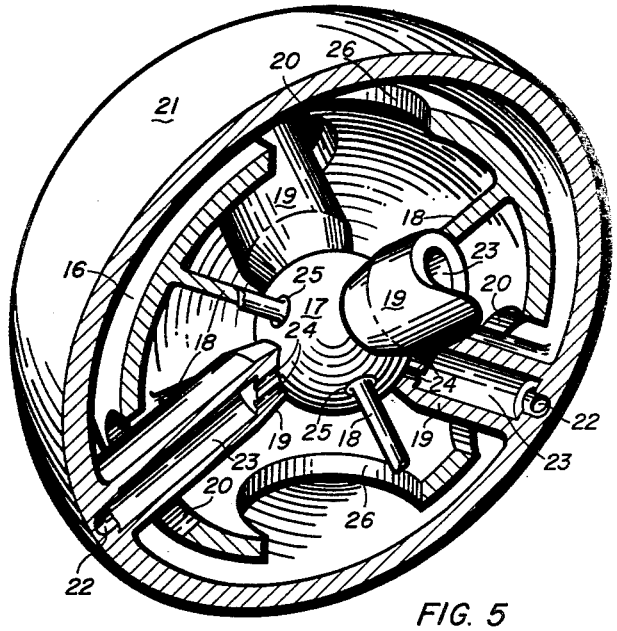
Figures 5 and 6 are perspective and sectional views respectively of a gyroscope having an external rotor supported from the central ball by four rods and having an intermediate frame member containing four gas bearing pads of simple design, such as that shown in Figure 4.
Figure 6:
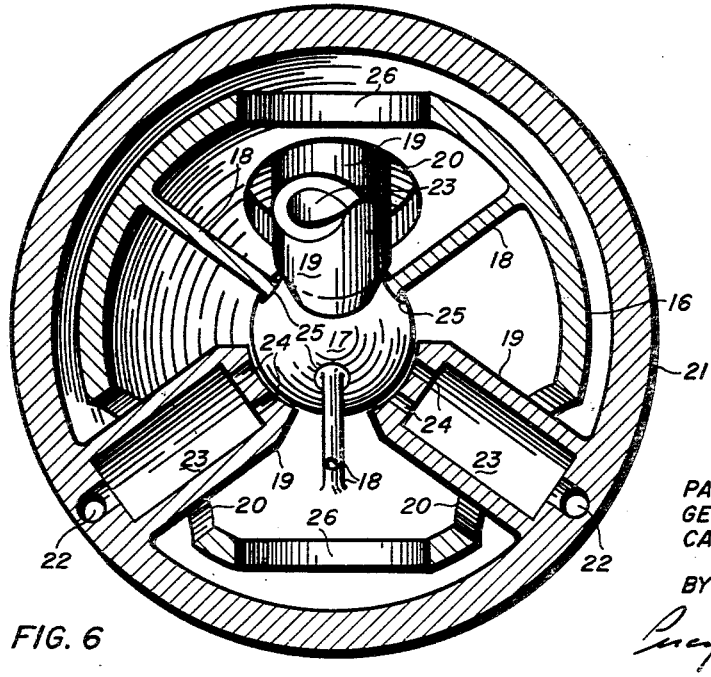

Referring to Figures 5 and 6, it will be seen that a smaller bearing radius and a larger rotor radius than those of Figures 1 and 2 can be simultaneously achieved by the provision of an external rotor 16 constructed with a comparatively large radius and attached to a much smaller bearing sphere 17 by the use of spokes or supporting rods 18. (These figures also illustrate the earlier mentioned principle of complete support of the bearing sphere 17 with only four bearing pads oriented like the faces of a tetrahedron.) These bearing pads 19 pass through clearance holes 20 in the external rotor. Therefore, in principle, the operation is the same as in the previous embodiment except for reduced bearing friction accomplished by the use of a much smaller bearing radius.

The bearing pads 19 though shown integral with the intermediate frame 21, will preferably be separate pieces fixed thereto at assembly. Gas brought into the frame 21 is distributed through manifolding 22 to the chambers 23 in the bearing pads 19 from which it exits through the feed holes 24 to the bearing surface. Small moats or troughs 25 are provided around the connecting points between the rotor rods 18 and the bearing sphere 17 to facilitate welding these rods to the sphere without deformation or damage to the precision surfaces of the bearing sphere 17. Circular holes 26 are provided in the external rotor 16 to provide surfaces for pick-offs (not shown). The entire rotor assembly might well be constructed of quartz which exhibits extraordinary stability characteristics.

Figure 11:
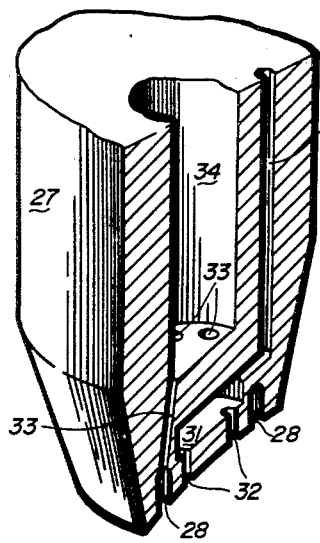
Figure 11 is a sectioned perspective of a single evacuation ring type of gas bearing pad such as that used in the unit shown in Figure 8.

The bearings pads 19 used in Figures 5 and 6 are of a basic form such as that shown in Figure 4. However, other pad constructions such as those of Figures 11 and 15 are applicable and might well be more advantageous in order to reduce a certain aerodynamic error, resulting from the damping effect of the gas existing between the rotor 16 and the rotor case or intermediate frame 21.

Figure 7:
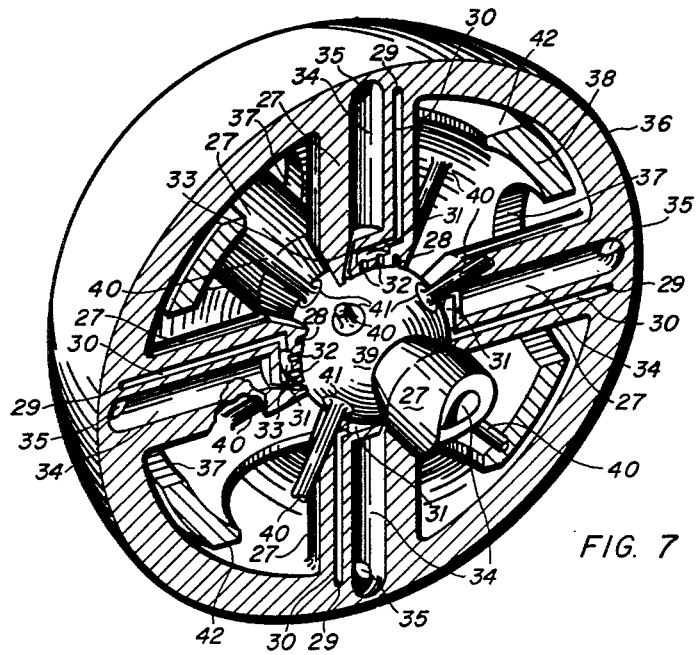
Figures 7 and 8 are perspective and sectional views respectively of an eight-rod external-rotor type gyroscope with six gas bearing pads of the single evacuation ring type.
Figure 8:
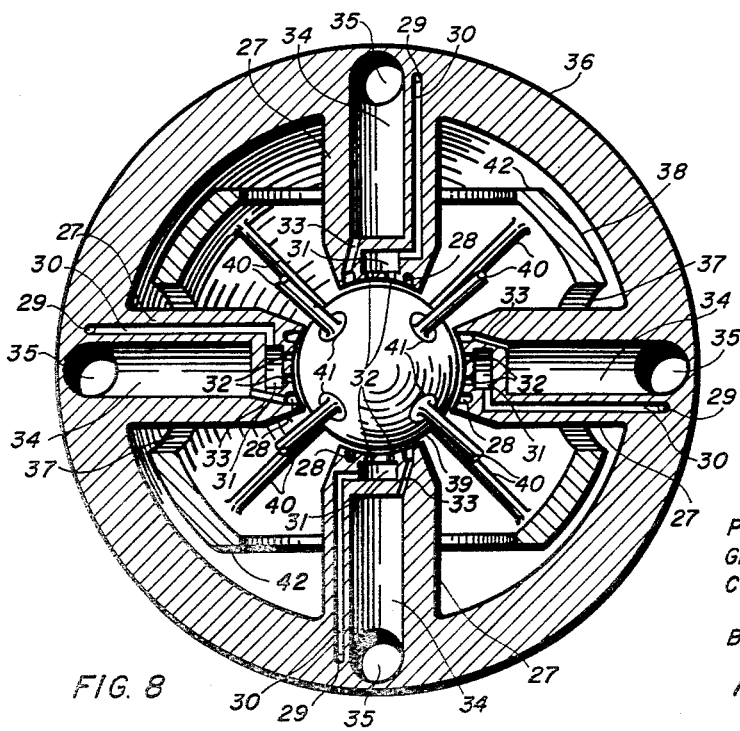

Figures 7 and 8 illustrate another form of the external rotor type of construction wherein six orthogonally arranged bearing pads 27 are used. The design of these bearings pads 27 is an example of a somewhat more complex type of pad using a single evacuation ring 28 as shown in more detail in Figures 11 and 12. In this case, high pressure gas is supplied through manifolding 29 into feed tubes 30 and then to the high pressure chambers 31 from which the gas is brought to the bearing surface through the very minute feed holes 32. Minute grooves 54 may be needed from holes 32 to ring 28 in order to loss down the activity of the self-servoing action just enough to prevent oscillation. As the gas travels across the surface of the pad (and through the lossing grooves if provided) it reaches the evacuation ring 28 from which it is drawn through holes 33 into the vacuum chamber 34 and withdrawn through manifolding 35. A still higher vacuum is also placed on the gastight case 36 (which serves as the rotatable intermediate frame of this gyroscope) so as to withdrawn any additional gas that has managed to pass the evacuation ring 28. Such an evacuation system can very greatly reduce the aerodynamic damping error. The bearing pads 27 extend from the inner surface damping of the rotor case 36, through holes 37 provided in the external rotor 38 until they almost meet the bearing sphere 39. The external rotor 38 is supported from sphere 39 by eight rotor rods 40 oriented like the faces of an octahedron (or like the corners at a cube). Where rods 40 meet the bearing sphere 39 troughs 41 are provided to facilitate construction. Flat areas 42 at the top and bottom of the rotor 38 provide pick-off surfaces.

Figure 9:
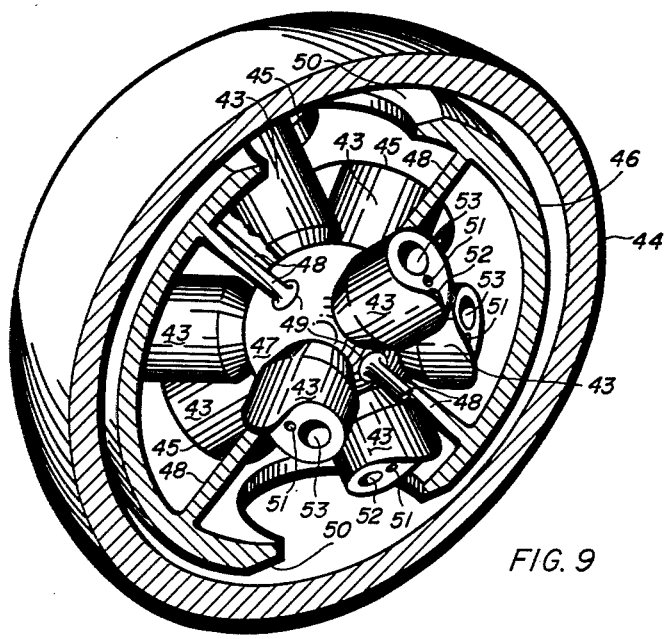
Figures 9 and 10 are perspective and sectional views respectively of a gyroscope with external rotor supported by six rods and having for its intermediate frame member a gastight case within which are eight gas bearing pads of the double evacuation ring type.
Figure 10:
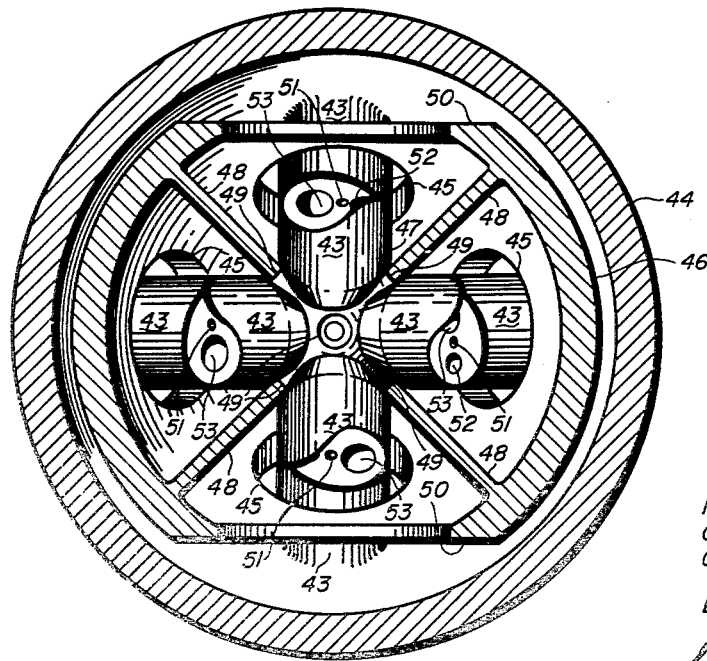

Figures 9 and 10 show another variation of the external rotor type of gyroscope having eight bearing pads 43 oriented like the faces of an octahedron. As in the previous cases, the bearing shafts 43 extend from the gastight casing 44 (which constitutes the intermediate frame member) through holes 45 provided in the external rotor 46. To the quartz spherical bearing 47 are welded a set of six orthogonally oriented quartz rods 48 which support the quartz external rotor 46; and the usual troughs 49 are provided around weld points. The top and bottom of the external rotor 46 are cut off as shown to provide two flat surfaces 50 for sensitive pick-off purposes. It will be noted in the figures that there are three chambers in each of the bearing pads 43. This represents a still more elaborate type of bearing pad design, shown in more detail in Figures 14 and 15, and incorporating two separate evacuation rings surrounding the bearing surface area. The smallest chamber 51 supplies high pressure gas to the very minute bearing feed holes 89 through the disc shaped chamber 90, whereas the medium sized chamber 52 is used to apply a moderate suction to the inner ring 91 of the pad through the connecting holes 92. The largest chamber 53 then applies a considerably higher suction to the second or outer evacuation ring 93 through the connecting holes 94. In this unit a still higher degree of vacuum is applied to casing 44 in order to evacuate any gas that has been able to escape past both evacuation rings.

Figure 12:
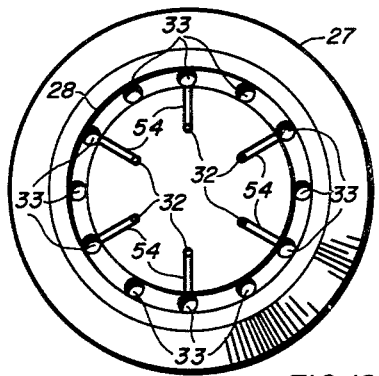
Figure 12 is an end view of one type of single evacuation ring type of bearing pad showing one feasible feed-hole arrangement.
Figure 13:
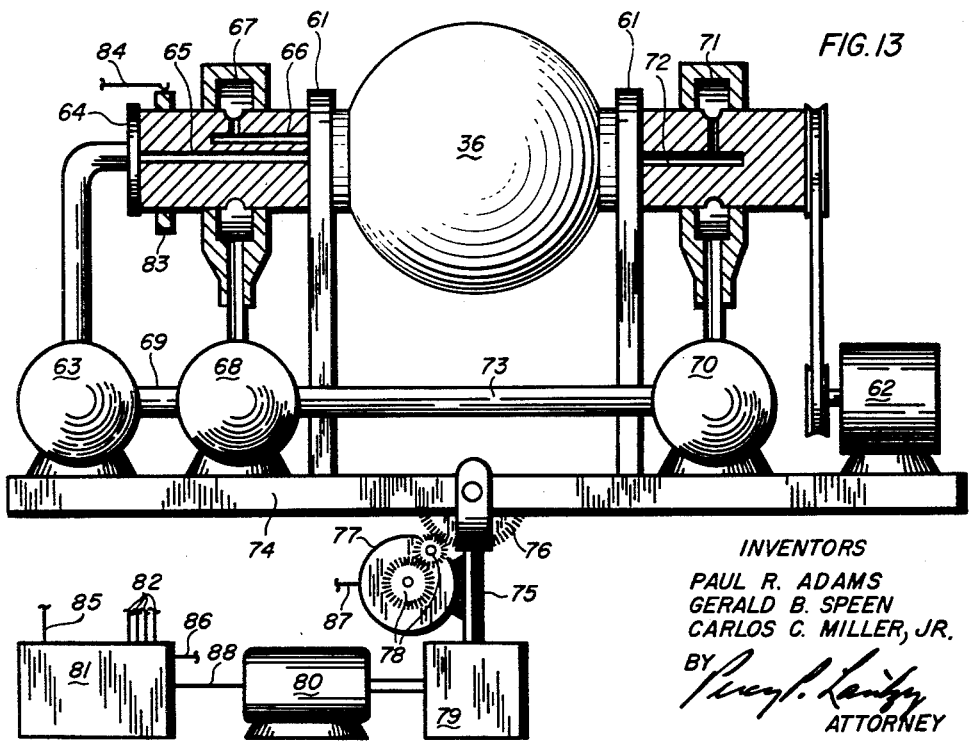
Figure 13 is a schematic diagram of a gyroscope stabilized system wherein the gyroscope uses single evacuation ring type bearing pads such as that shown in Figure 11, and whose intermediate frame member is a gastight case which is also evacuated.

Figure 13 schematically illustrates a gyroscope stabilized platform or system using a gyroscope with single evacuation ring bearing pad such as that of Figures 7, 8, 11, and 12. The "intermediate frame" of this gyroscope is in the form of a gastight case 36, and is mounted in mechanical bearings 61 and rotated by a driving system 62. The pump 63 supplies high pressure gas through the rotating joint 64 into a supply channel 65, from which the high pressure air is conducted to the bearing pads through a suitable manifolding system in the gastight case 36. The gas from the feed holes 32 (Figure 11) is drawn into the evacuation ring 28 (Figure 11) and withdrawn through the evacuation channel 66 into a gas type slip-ring assembly 67. The vacuum pump 68 withdraws the air from the slip-ring assembly 67 and may deliver this gas through the tube 69 to the pressure pump 63, if recirculation is desired. The vacuum pump 70 withdraws gas through another slip-ring assembly 71 from the gastight case 36 through the channel 72, located within the rotating assembly. The gas being exhausted by the vacuum pump 70 is conducted to the vacuum pump 68 through the tube 73, where it is combined with the gas from the evacuation ring. The servoing system schematically represented in this figure operates as follows:

The entire system thus far described is mounted on a main frame 74 which is gimballed as before. The gimbals 75 allow rotation of the main frame 74 about two axes. The gear 76 attached to the platform 74 is connected to the motor 77 mounted on the gimbal 75 through a gear train 78. The gimbal 75 is mounted in a gear box 79, which may be rotated by the motor 80, thus providing the two axes of rotation for the main frame 74. The pick-offs (not shown), located between the rotor and the intermediate frame 36, supply electrical impulses indicating their relative positions to the synchronous demodulator and amplifier 81 through electrical slip-rings (not shown) and the inputs 82. A synchronizing unit 83 is provided on a suitable member of the intermediate frame 36 and a wiper arm 84 in contact with the synchronizing unit 83 provides the interrupted signal or pulses to the synchronizer demodulator 81 through the input 85 for reduction of the signals to main frame 74 rather than intermediate frame 36. The output 86 of the amplifier 81 is directed to input lead 87 of motor 77 to control the tilt of main frame 74 while the output 88 of the amplifier 81 is used to control the motor 80 for azimuth corrections.

In this way, the alignment is maintained within a very small angle at all times. The more accurate the alignment so maintained, the more significant is the property of zero static friction possessed by gas bearings. Accordingly the servo system for main frame 74 should preferably be of a very refined form capable of maintaining alignment to a very small fraction of a degree (although shown in very crude form for ease of illustration).

It will be noted that by means of synchronizing system 83 the pick-off information obtained between the rotor 38 and intermediate frame 36 is effectively transformed into direct information about the rotor's position with respect to the main frame 74. It must be recognized that a pick-off system could just as effectively be placed between the rotor and the platform directly, and in this way eliminate the necessity for synchronization and synchronous demodulation to obtain rotation position information between the rotor case and platform. This could be accomplished by various means, an example of which might be by making the intermediate frame with a transparent portion and using a photoelectric pick-off device operating directly between the platform and the rotor pick-off surface. Also the torquers for the above system although represented schematically by gear-connected driving motors 77 and 80, may in actual practice, be any type of torquing mechanism and platform suspension. (The operation of this system is entirely analogous to that shown in Figure 3, and the servoing arrangements of Figure 13 may be considered as being also shown applied to Figure 3.)

The basic gyroscope system using the double evacuation ring type of gas bearing pad is shown in Figure 16, schematically. Here the intermediate frame 98 is in the form of a gastight case and is supported in some sort of mechanical bearings 99 and rotated by some driving mechanism 100. A high pressure pump 101 forces gas through the conducting pipe 102 and rotating joint 103 into the channel 104 from which the gas is distributed throughout the manifolding system in the rotor case 98 to the various bearing pads. The escaping gas in each bearing pad is drawn into the first or inner ring 91 (Figure 14) of each pad, where it is transferred to the first vacuum channel 105. The vacuum pump 106 removes the gas from the vacuum channel 105 through a gas type slip-ring assembly 107. The gas removed from the first evacuation ring by this vacuum pump 106 is exhausted through tube 108 into the pressure pump 101, where it is recirculated if desired. The gas escaping past the first evacuation ring is drawn through the second evacuation ring 93 (Figure 14) into the vacuum channel 109 and withdrawn by means of a second vacuum pump 110 through the gas type slip-ring assembly 111. The gas exiting from the vacuum pump 110 is fed into the vacuum pump 106 through the tube 112, so that this gas may also be recirculated. Since the mass of the gas removed from the second evacuation ring is so many times smaller than that evacuated from the first evacuation ring, because of the difference in pressures, the feeding of this additional gas into the vacuum pump 106 is hardly significant and the operation of the vacuum pump 106 is unaffected. Any gas that might escape from the second evacuating ring enters the gastight case 98 and is removed through a further vacuum process into the vacuum channel 113. The vacuum pump 114 removes this gas as before through a gas type slip-ring assembly 115, and dispels this gas through tube 116 into the vacuum pump 110. Since the gas has been withdrawn twice in the evacuation rings the pressure of the gas escaping from the second ring is exceedingly low and therefore there is only a very small mass flow. Thus a fairly high vacuum can be maintained in gastight case 98, and therefore, when the gas removed from the case 98 is added to the gas in pump 110, it is hardly significant, because of the much higher masses being carried by this pump. As before, the entire assembly is mounted on (or in) a main frame (or outer casing) 117, and gimballed with the necessary gimbals 118. The pick-offs, torquers, electrical slip-rings, and servo system are not shown, since they are of some conventional type, or are similar to that used in the sample system shown in Figure 13.

In each of the above described embodiments, the pumps have been schematically shown on the platforms on which the gyroscope assembly is mounted. It should be noted that it may be more desirable to have these pumps external to the main assembly, if a more convenient location outside the system is found. In such a case the same system operation is accomplished by carrying the necessary vacuum and pressure lines through the gimbals that support the platform or main frame by means of flexible tubing or through gas type slip-rings such as those used between the gyroscope rotor case and the pumps in the schematics shown herein. It is also sometimes preferable to use a tank of pressurized gas to replace the pressure pump.

The pick-offs that are provided between the gyroscope rotor and the rotor case must be sensitive in at least two degrees of freedom in every case. However, it is important to note that in the case of the external rotor type constructions shown in Figures 5, 6 or 7, 8 or 9, 10, a third-pick-off device must be provided for the rotation axis because the bearing shafts extend through the external rotor, and if, for some reason, the rotor were to spin about the axis of rotation slightly ahead or behind the rotor case and bearing pads, a contact might occur. If the possibility of any part touching occurs, the rotor case must be accelerated or slowed down accordingly. Such a pick-off need not be very accurate, since it need only ensure that contact not take place.

Figure 17:
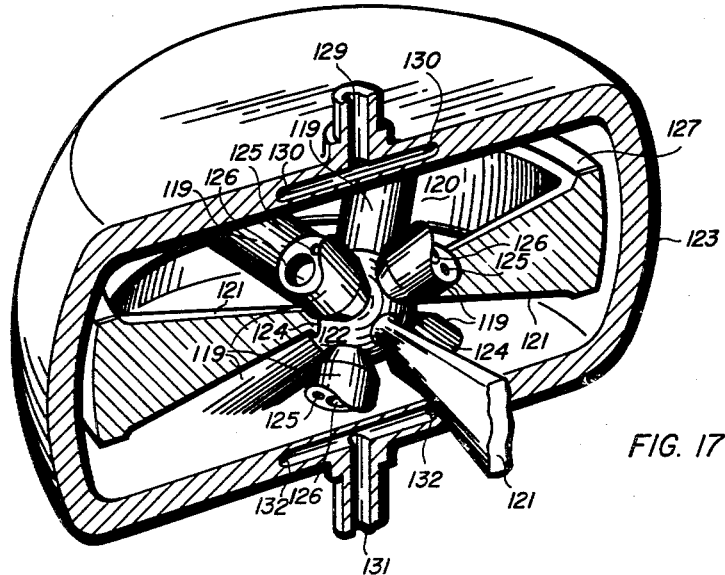
Figure 17 is a perspective view of one version of the external rotor type gyroscope system that is more convenient for construction wherein four flat spokes support the rotor from the central ball and wherein eight gas bearing pads are used for support of the central ball.
Figure 18:
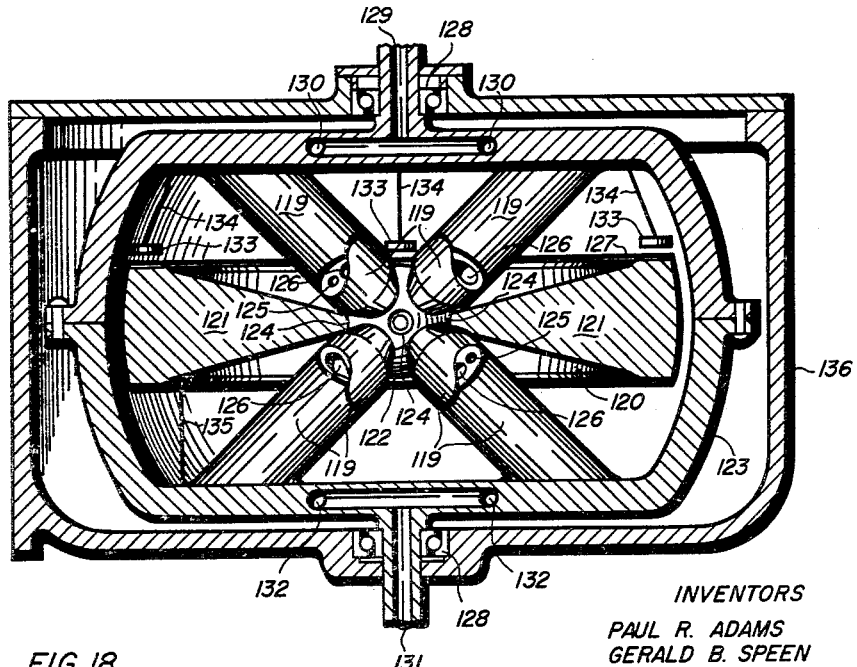
Figure 18 is a sectional view of the same gyroscope illustrated in Figure 17, but is more complete in that its intermediate frame is shown mounted in ball bearings in a stationary main frame.

All of the above systems and configurations of gyroscopes have their spokes or support rods, and also their bearing pads, arranged to correspond to the faces of the regular polyhedrons. Thus they are theoretically isoelastic if we assume perfect rigidity of the intermediate case which supports the pads and of the external rotor member which is supported by the spokes or rods. By slightly altering the orientations of the support rods to compensate for imperfect rigidity of rotor and intermediate frame, their anisoelasticity can be reduced to a value dependent only on manufacturing accuracy. Figures 17 and 18 illustrate an example of a configuration which is not theoretically isoelastic, but which is relatively simple to construct, and rigid enough so that its theoretical anisoelastic motion will be fairly small. The gyroscope illustrated is basically the same type of gyroscope as that shown in Figure 9, in that eight bearing pads 119 and an external rotor construction 120 are used. In this case, however, instead of using six spokes as in the previous case, four flat structural members 121 are used to connect the external rotor 120 to the bearing sphere 122. In this case the external rotor 120 does not have holes for the bearing pads 119 to fit through. Instead, the rotor is made narrow enough for this to be avoided, and as a result, this embodiment like that of Figures 1 and 2 may be operated with its rotor (120, 121, 122) turning faster than its intermediate frame 123, provided that the bearing pads 119 are small enough to allow passage of the rotor support members 121. Therefore, a pick-off for the axis of rotation is optional and may be omitted in such a case. The bearing pads extend inward from the inner wall of the intermediate frame 123. The bearing sphere 122, to which these flat members 121 are welded, is provided with troughs 124 at the attachment points to facilitate efficient assembly. The high pressure channel 125 and the single evacuation channel 126 shown in this figure indicate that the pads 119 are of the single evacuation ring type. However, any arrangement of bearing pads using any system of evacuation is suitable for this design, depending on the application. The flat area at the top of the external rotor 120 is covered with a conductive coating 127 for pick-off purposes (pick-offs not shown).

Figure 18 shows the gyroscope unit of Figure 17 mounted in ball bearings 128, within a main frame 136. The high pressure feed channel 129 is shown feeding into its manifolding system 130 for distribution of gas to the bearing pads 119. A similar vacuum channel 131 and its manifolding 132 are provided for exhausting the evacuation ring. Provision for evacuating the rotor case 123 may obviously be added. The capacitive type pick-offs 133 are shown schematically supported by the insulating stand-offs 134 in a position opposite the conductive ring 127. If a balanced type of pick-off is preferred, conductive rings and pick-offs could be provided both above and below the rotor. The insulating stand-off 135 supports another pick-off for determination of relative angular position about the axis of rotation.

It has been previously pointed out that one important feature believed to be broadly novel in the present invention is the provision of a rotor swiveling arrangement which supports a rotor with respect to an intermediate frame member, and which employs gas bearings to provide two degrees of tilting freedom for the rotor axis, together with some provision for rotating the intermediate frame member (at the rotor spin rate or some lower rate) so that the steady state torques created by any unbalance in the gas bearing will continually cancel themselves. It must be emphasized that although the preferred embodiments make use of a central spherical gas bearing, the broadest form of this principle is not limited to this form, but may be applied to other types of systems which employ a combination of several journal type gas bearings, instead of one spherical one, in the rotor swiveling arrangement.

Figure 19:
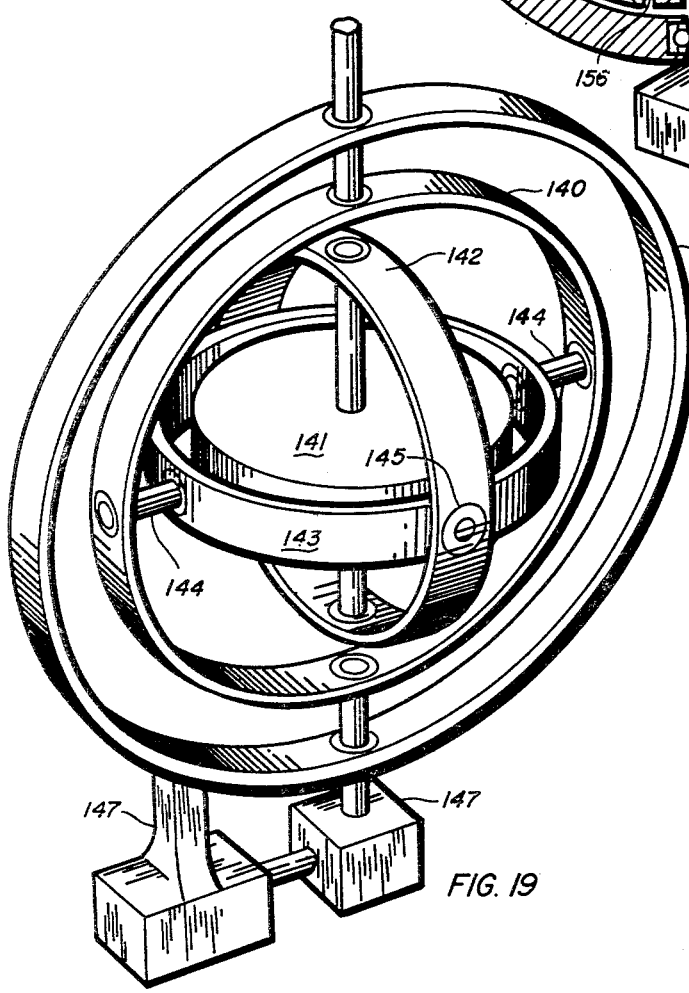
Figure 19 is a schematic diagram of a gyroscope whose rotor-swiveling arrangement is in the form of a conventional set of gimbals.

Figure 19 shows one such alternative form employing journal gas bearings. In this embodiment an intermediate frame member 140 supports one type of conventional gimballed rotor configuration consisting of the rotor 141 supported by first gimbal 142 and second gimbal 143 from the intermediate frame member 140. Journal gas bearings 144 afford the second gimbal 143 one degree of tilting freedom with respect to the intermediate frame member 140, while journal gas bearings 145 afford the first gimbal 142 another degree of tilting freedom with respect to gimbal 143. Thus the whole rotor swiveling arrangement provides two degrees of tilting freedom for the rotor with respect to the intermediate frame. This intermediate frame 140 is now rotated within a suitable main frame 146 by rotation means 147. The bearings between intermediate frame 140 and the main frame 146 may be of any conventional type, e.g. ball bearings. The rate of rotation of the intermediate frame member 140 is preferably much lower than the spin rate of the rotor 141, being, for example, of the order of one or a few rotations per second.

By this simple expedient of rotating the intermediate frame member 140 the steady torquing errors of the gas bearings are neutralized and the conventional configuration (Figure 19) gains some of the advantages of the present invention. It is true, however, that a motor (not shown) must still be provided to rotate rotor 141 with respect to gimbal ring 142, and that the heat generated by this motor and by the spin bearings of the rotor will be dissipated in the gimbal rings which constitute the rotor swiveling arrangement. It is also true that the whole structure is somewhat less rigid and therefore suffers greater anisoelastic error than the preferred forms shown in earlier embodiments.

Figure 20:
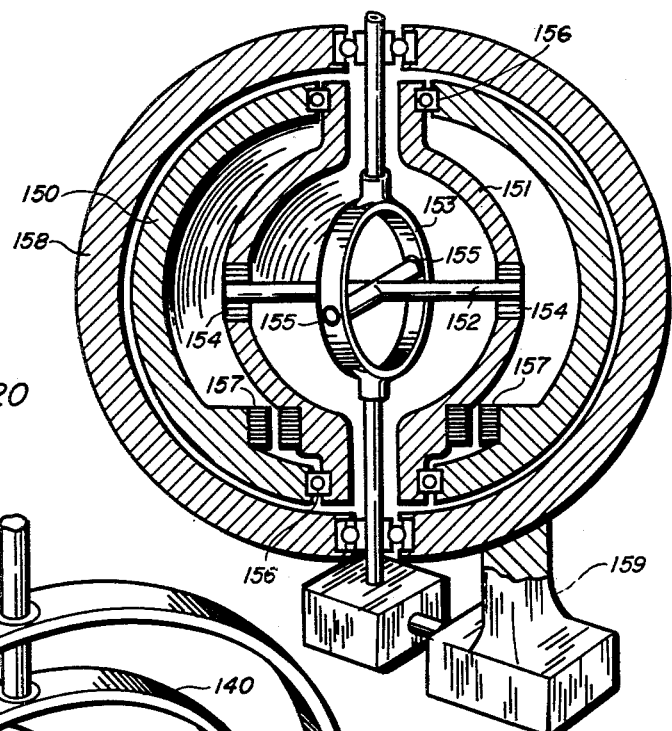
Figure 20 is a schematic diagram of a gyroscope whose rotor-swiveling arrangement is essentially equivalent to a conventional set of gimbals, but with the rotor surrounding the gimbals to increase its moment of inertia relative to that of the gimbals.

Figure 20 shows another essentially equivalent embodiment wherein a rotor 150 is supported by a first gimbal member 151 and a second gimbal member 152 from an intermediate frame member 153. In this embodiment gimbal member 152 is of cruciform shape, so that the complete suspension of member 151 from intermediate frame member 153 takes the form of a conventional Hooke's Joint suspension, such as previously used on low-grade, or medium-grade gyroscopes. A pair of suitable journal gas bearings 154 and another pair of similar bearings 155 give to the rotor 150 two degrees of tilt freedom with respect to the intermediate frame member 153, the gas being supplied thereto by a suitable set of gas slip-rings and passages (not shown) as in other embodiments above described. The rotor 150 is supported by conventional ball bearings 156 from the member 151 and is driven by a suitable spin motor 157.

The complete assembly thus described, including intermediate frame member 153 and all the other portions supported from it, is now rotated in main frame 158 by a suitable rotating means 159. In this embodiment also the rotation rate of intermediate frame member is preferably much lower than the spin rate of the rotor 150.

Figure 21:
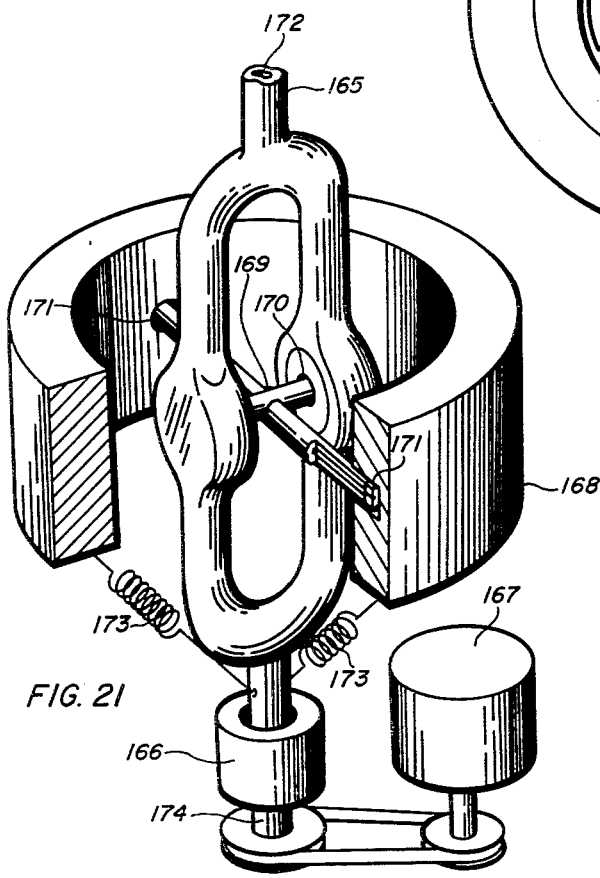
Figure 21 is a schematic diagram of a gyroscope whose "rotor-swiveling arrangement" is in the form of a Hooke's Joint with four cylindrical gas bearings (rather than one spherical gas bearing.)

Still another embodiment of the broad principle of the present invention is shown in Figure 21. This is actually a straight Hooke's Joint type of gyroscope equivalent to that used in the Ferranti Gyroscopic Gunsight Mark 4E, shown on page 325 of "The Gyroscope Applied" by K. I. T. Richardson. The operation of such a Hooke's Joint gyroscope was examined in part analytically and in part experimentally by Professors R. N. Arnold and L. Maunder and is described in an article entitled "The Motion Due to Slow Precession of a Gyroscope Driven and Supported by a Hooke's Joint" in a journal of the Institution of Mechanical Engineers issued in Great Britain in 1951. In this article by Professors Arnold and Maunder, it was shown that windage and friction in the gimbal bearings cause the rotor axis to straighten out, i.e., to align itself with the axis of rotation of the supporting intermediate frame member, but that a special kind of moment of inertia of the cruciform gimbal member causes the rotor axis to precess conically. Both these motions are far too large to be tolerated in a low drift gyroscope application.

In accordance with a special feature of the present invention, the Hooke's Joint type of gyroscope, which has heretofore appeared wholly unsuitable for the truly low drift applications is made to give very good results by a combination of several expedients. First, the four journal bearings at the four ends of the cruciform gimballing member are replaced by gas bearings, preferably with multiple evacuating rings in order to permit the removal of most of the gas before it leaks out of the bearings to the surrounding space. Second, the complete gyroscope is housed in a gastight casing which rotates with the gyroscope, and which is evacuated to a low gas pressure. Third, a spring arrangement is included which provides a suitable amount of elastic restraint between the intermediate member and the rotor.

Referring more particularly to Figure 21, the intermediate member 165 is spun rapidly in the main frame member 166 by a massive spinning device 167. Although the main frame member 166 is shown supporting the intermediate frame only at the bottom, it presumably also has top support, which is not shown. Rotor 168 is supported from the intermediate member 165 by the cruciform swiveling member 169. This member 169 is rotatedly attached to the intermediate frame 165 through a pair of journal gas bearings 170 (only one of which is shown); and the member 169 is also rotatedly attached to the rotor 168 through another pair of journal gas bearings 171. These gas bearings are fed with high pressure air or other gas through the passage 172, which extends through passages in the member 165 to gas bearings 170. These gas bearings act not only as gas bearings but also as gas slip-rings to supply high pressure gas to the cruciform member 169, which then conducts it to the final gas bearings 171. A slip-ring arrangement (not shown) is used to supply the high pressure gas to manifold 172.

A set of springs 173 is provided between intermediate member 165 and rotor 168. Although only two springs are shown for simplicity of illustration, it is understood that four or six, or any other number, may be provided as needed. Furthermore, these springs may be of some other form (e.g. one torsion spring applied between swiveling member 169 and the rotor, and another between member 169 and the intermediate frame 165, rather than extending directly between the intermediate frame 165 and the rotor 168).

The elastic constant of these springs should be such as to neutralize the inertial forces due to the moment of inertia of the cruciform member 169 at the particular rotational speed desired. The proper proportioning of the elastic constant of the springs with respect to the speed of rotation desired and the special moment of inertia of the cruciform member 169 can best be determined by experiment in each case. If the cruciform member 169 is completely symmetrical, the elastic restrain between members 165 and 168 should be the same in all directions of tilt. This is the preferred form. In such case, the rate of build up of spring torque with respect to misalignment angle required is proportional to the square of the spin rate and is also proportional to a special function of the moments of inertia of member 169. This special function essentially consists of the sum of the moment of inertia of member 169 about one of its arms, plus the moment of inertia thereof about the other of its arms, minus the moment of inertia thereof about an axis perpendicular to both arms. This function is therefore simply the summation of the mass of each elementary particle of the cruciform member multiplied by the square of the distance of that particle from the central plane defined by axes of the two symmetric arms. It will thus be seen that this quantity is fairly small, so long as the cruciform member 169 has moderate mass and small dimensions in the direction of the rotor axis.

In accordance with the principle discovered by the present invention, the steady state torque of the gas bearings 170 and 171 will produce no undesirable precession of the rotor axis in any direction, since the constant rotation of the axes continually neutralizes this effect. The effect of windage and of the tiny viscous friction in the journal gas bearings tend to cause the rotor to align itself with the axis of intermediate member 165, but each of these effects approaches zero as the angle of inclination between the intermediate member 165 and the rotor 168 is decreased. It is therefore a teaching of the present invention that, in spite of these windage and viscous friction effects, the drift rate of the gyroscope may be made smaller than any desired rate merely by employing it in a sufficiently good stabilization system which continuously maintains the axis of rotation of member 165 in line with the axis of rotor 168. This property of approaching zero drift rate as the angle of inclination approaches zero is not characteristic of ordinary Hooke's Joint gyroscopes, and it is believed that the usefulness of the above suggested combination has never been appreciated.

Theoretically, another small drift effect is produced by the moments of inertia of intermediate frame 165 and of driving means 167, which resist the slight acceleration and deceleration of member 165, resulting from an angle of inclination between the rotor axis and the driving axis. In practice, however, this effect is a third order drift which rapidly approaches zero as the misalignment angle is reduced, and therefore, for small angles it can usually be neglected. If this effect is troublesome, however, it may be reduced by one or two orders of magnitude merely by adjusting the torsional elasticity of shaft 174 so as to produce a resonance at the desired speed of rotation. This is best done empirically as follows: After having first reduced the linear or first order effects of the cruciform moment of inertia above described by properly adjusting springs 173 under conditions of very small angular deviation between driving and rotor axes, then by substantially increasing the angular deviation between these axes, the third order effects, such as that due to the moment of inertia of members 165 and 167 will begin to become prominent, and these can then be reduced by empirically thinning down shaft 174 so as to reduce this error to zero at approximately the desired speed of rotation.

Figure 22:
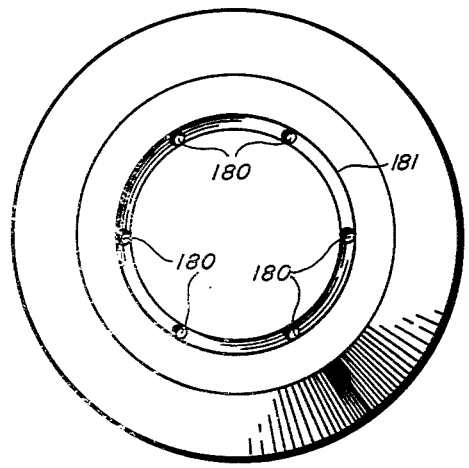
Figures 22 and 23 are end views of two bearing pads showing two alternate types of feed hole and gas distribution arrangement.
Figure 23:
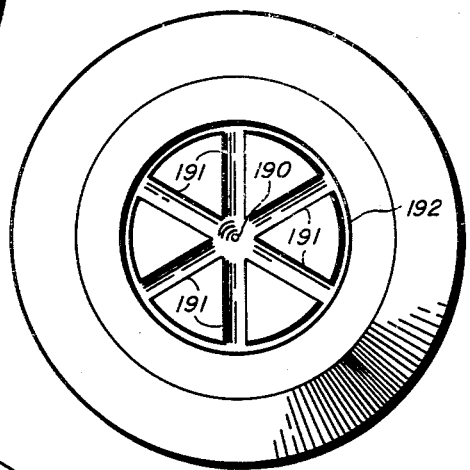

Figures 22 and 23 illustrate some preferred forms of bearing pads which may be used in many of the previously described embodiments which make use of a spherical central bearing. These pads may also be used as spherical bearings, step bearings or thrust bearings in other applications. Many other practical configurations of feed holes and groove arrangements are known to be useful and efficient and those illustrated are for the purpose of example only.

Referring more particularly to Figure 22, this shows a series of six almost microscopic feed holes 180 just as shown in Figures 11 and 12. In this embodiment, however, these are interconnected by a narrow, shallow, circular or roughly circular equalizing groove 181 having a cross sectional area of the same order of magnitude as the diameter of one feed hole and preferably equal thereto within a ratio of 2:1, larger or smaller. This type of equalizing groove is particularly effective in increasing the load bearing capacity of the bearing without appreciably decreasing its tendency to oscillate. If oscillation tends to take place, it can be eliminated by the use of minute lossing grooves or scratches extending radially outward from the feed holes (or less desirably from one other part of groove 181) to the edge of the bearing, or by stepping back the surface just outside of this groove 181, so that this surface is a little lower than the bearing surface within the groove. In such a case, the difference must amount to something of the order of a few tens of millionths of an inch for the usual sizes of bearings likely to be used in gyroscopes. The area of such lossing grooves or the depth of such step-back should be only slightly greater than necessary to safely prevent oscillations.

Figure 23 shows an alternative form theoretically slightly less efficient, but practically considerably easier to construct. In this form, the six nearly microscopic feed holes used in other embodiments have been replaced by a single, somewhat larger, feed hole 190, which supplies gas through six distributing grooves 191 to the equalizing groove 192. The total depth and width of each groove 191 should be such as to provide a cross sectional area roughly twice as great as that of equalizing groove 192 (preferably between 1.5 and 4.0 times as great). This groove 192 should have cross sectional area of the order of $1/N$ times that of the central hole 190 where N is the number of radial distributing grooves (i.e., 6 in the case illustrated). Preferably the cross sectional area of groove 192 is between $1.2/2N$ and $4/2N$ times the area of hole 190.

It should be clearly understood that the preferred bearing pad forms shown in Figures 22 and 23 may be substituted for the simpler forms shown in any of the preceding figures which use spherical bearings. In those embodiments which require evacuating rings, the same arrangement of feed holes and distributing grooves shown in Figures 22 and 23 may be used but with the evacuating rings added outside thereof.

It should also be understood that any of the forms of gyroscopes employing central spherical bearings may be used with double, single, or no evacuation grooves, even though only a few of such combinations and permutations have been illustrated.

In general, where the case is evacuated the pressure in the case should be kept below $1/10$ atmosphere; where an evacuation ring is used as well as case evacuation, the pressure in the case should be kept below $1/30$ atmosphere and preferably below $1/100$ atmosphere. With double evacuation rings it should be kept below $1/200$ atmosphere, and preferably below $1/1000$ atmosphere.

In all cases of mutistage vacuum—whether one evacuation ring and then the case, or one evacuation ring followed by another such ring—the ratio of the pressures should be such that more than 80% by weight of all the gas entering a given ring or case is drawn off by the suction connected thereto and less than 20% leaks past to the next stage. Preferably these percentages should be above 90% and below 10%.

The simple essentially ball-shaped rotor shown in Figures 1 and 2 is preferred in most cases. Preferably such simple ball-shaped rotor should have at least 25% of its equivalent outer surface finished as an accurately spherical surface for cooperation with the gas bearing pads. In certain special applications where the very lowest drift rate is so essential as to outweigh all considerations of size, weight, complexity or cost, and when at the same time the requirements for withstanding shock, vibration, and acceleration are not too severe, a more complex rotor with inner and outer portions is preferred. When such more complex rotor is used the ratio of its outer radius to the radius of the bearing sphere should exceed 2:1 (and preferably 3:1) and the ratio of the moments of inertia of the whole rotor to that of the bearing sphere should exceed 20:1 and preferably 100:1.

In all such complex rotors, the size of the pads, the spokes, the moats and imperfect areas around the spokes should be such that at least one tenth, and preferably one-fifth of the area of the spheroid is in the form of an essentially perfect spherical surface which usefully engages the bearing pads. The fraction of the area which actually supports the load may be much smaller since the above percentages include the total area of the pad, including evacuation rings and inter-ring zones, but preferably the area actually used for support should not be less than $1/20$ of the total equivalent area of the spheroid. (By total equivalent area of the spheroid is meant the area which it would have if its perfectly spherical surface were extended to make a complete sphere.)

Where necessary to increase the useful bearing area of the pads, these pads may be enlarged until they become tangent to each other, and may even be further enlarged so that adjacent pads meet along a substantial portion of their periphery, but it is preferred that in all cases at least one-half of the periphery of each pad be kept separate from all other pads, so that at least half of the periphery is available for discharge of gas to the case or to an evacuation channel. No more than half of the periphery of any pad should form a common boundary with other pads, so as to be exposed to interaction from such other pads. Where an evacuating ring or evacuating channel surrounds the actual working portion of a pad or lies between this active portion of one pad and that of the next pad, this shall not be considered as a common boundary region.

Although certain specific embodiments and illustrations have been shown and described above by way of example, it should be understood that the scope of the present invention is not limited to that, but is to be considered as covering all features described in the objects of the invention, the foregoing description of the drawings and the appended claims.

We claim:

1. A gyroscope comprising a frame, a rotor, means rotatably supporting said rotor relative said frame, said supporting means comprising a plurality of pairs of separate gas bearing pads with the gas bearing pads of each of said pairs disposed in opposed axial relation, said rotor having bearing means disposed in coactive association with the gas bearing pads of each of said pairs, the axes of said pairs being disposed in coincidence with corresponding center lines of opposed faces of an imaginary regular polyhedron and means associated with said frame to supply gas to said bearings.

2. A gyroscope according to claim 1 wherein said rotor is in the form of a sphere.

3. A gyroscope according to claim 1 wherein said frame comprises a hollow body and means coupling said gas bearing pads for disposition inwardly of said body.

4. A gyroscope according to claim 1 wherein said frame comprises a hollow body, means coupling said gas bearing pads for disposition inwardly of said body, each of said gas bearing pads comprising a body having a chamber therein and means communicating said chamber with the bearing surface thereof.

5. A gyroscope according to claim 1 wherein said rotor is in the form of a sphere, said frame comprises a hollow body and means coupling said gas bearing pads for disposition inwardly of said hollow body, means disposing said rotor centrally of said frame and intermediate each said pair of gas bearing pads, each of said gas bearing pads comprising a body having a concave spherical bearing surface adjacent said rotor and adapted to closely parallel the convex spherical surface of said rotor, and means coupling said gas supply means to said concave surface.

6. A gyroscope according to claim 1 wherein said frame comprises a hollow body, means disposing said gas bearing pads inwardly of said hollow body, each of said gas pads comprising a chambered body having a concave spherical bearing surface, said chambered body further comprising at least first and second chambers, means coupling said first chamber to said gas supply means, means for evacuating gas from said second chamber, a first plurality of openings coupling said first chamber to said concave end surface, an annular groove disposed in said concave surface, a second plurality of openings coupling said annular groove to said second chamber, a plurality of grooves disposed in said concave surface and coupling said first openings to said annular groove and said second openings whereby said gas is supplied to said first openings and evacuated through said second openings and said second chamber.

7. A gyroscope according to claim 6 wherein said gas bearing body further comprises a third chamber and means for evacuating gas therefrom, a second annular groove disposed in said concave surface, and a third plurality of openings coupling said second annular groove to said third chamber to further evacuate said gas.

8. A gyroscope according to claim 1 wherein each said gas bearing pad comprises a body having a chamber therein and an outer concave spherical bearing surface, an annular groove disposed in said concave surface parallel to the periphery of said concave surface and spaced inwardly of said periphery, and a plurality of openings coupling said chamber with said annular groove and means coupling said chamber to said gas supply means.

9. A gyroscope according to claim 1 wherein each said gas bearing pad comprises a body having a chamber and an outer concave spherical bearing surface, an annular groove disposed in said concave surface parallel to the periphery of said surface and spaced inwardly of said periphery, an opening coupling said chamber with said concave surface, a plurality of radial grooves coupling said opening to said annular groove and means coupling said chamber to said gas supply means.

10. A gyroscope according to claim 1 wherein said rotor comprises an outer substantially spherical body, an inner spherical body, a plurality of members coupling said inner sphere to said outer body in concentric relation thereto, a plurality of openings in said outer sphere to allow said gas bearing pads to extend therethrough and means disposing said inner sphere centrally of said frame and intermediate each said pair of gas bearing pads.

11. A gyroscope according to claim 1 wherein said rotor comprises an outer annular spherical body, an inner sphere, a plurality of members coupling said inner sphere to said outer body in concentric relation thereto, and means disposing said inner sphere centrally of said frame and intermediate each said pair of gas bearing pads.

12. A gyroscope comprising a main frame adapted normally to remain approximately rotationally fixed in space, an intermediate frame mounted on said main frame for rotation about a given axis, a rotor, means rotatably supporting said rotor relative said intermediate frame and affording said rotor at least two degrees of freedom of tilting of its axis, said supporting means comprising a plurality of pairs of separate gas bearing pads, the gas bearing pads of each of said pairs being disposed in opposed axial relation, said rotor having bearing means disposed in coactive association with the gas bearing pads of each of said pairs, the axes of said pairs being disposed in coincidence with corresponding center lines of opposed faces of an imaginary regular polyhedron and means associated with said intermediate frame to supply gas to said bearings.

13. A gyroscope according to claim 12 wherein said intermediate frame comprises a hollow body, means disposing said gas bearing pads inwardly of said hollow body, said rotor comprising an outer substantially spherical body, an inner sphere, a plurality of members coupling said inner sphere to said outer body in concentric relation thereto, a plurality of openings in said outer body to allow said gas bearing pads to extend therethrough, means disposing said inner sphere centrally of said intermediate frame and intermediate each pair of said gas bearing pads, each of said gas bearing pads comprising a chambered body having a chamber therein and a concave spherical bearing surface adjacent said inner sphere and adapted to closely parallel the convex spherical surface of said inner sphere, means coupling said chamber to said gas supply means, and means coupling said chamber to said concave surface whereby said gas is supplied to the space between said concave surface and said inner sphere.

14. A gyroscope according to claim 12 wherein said main frame comprises a first annulus, said intermediate frame comprises a second inner annulus, means coupling said second annulus to said first annulus for rotation of said second annulus relative to said first annulus, said rotor comprises a body disposed centrally of said second annulus, first gimbal means, second gimbal means, means coupling said rotor to said first gimbal means, said gas bearings coupling said first gimbal means to said second gimbal means and further coupling said second gimbal means to said second annulus.

15. A gyroscope according to claim 12 whereby said main frame comprises an outer spherically shaped body, said intermediate frame comprises an annular body, a plurality of oppositely disposed members coupling said annular body to said main frame centrally thereof and for rotation therein, said rotor comprises an inner spherically shaped body paralleling said outer body, means disposing said rotor centrally of said outer body and adjacent thereto, first gimbal means, second cruciform gimbal means, said gas bearing means comprising gas journal bearings coupling said second gimbal to said intermediate frame and further coupling said first gimbal means to said second gimbal means, and bearing means coupling said first gimbal means to said rotor.

16. A gyroscope according to claim 12 wherein said intermediate frame is in the form of an oblate annulus, said rotor comprises an annular body, said supporting means further comprises cruciform gimbal means disposed in said gas bearing means and coupling said rotor to said intermediate frame.

17. A gas bearing comprising a body having a concave spherical bearing surface, first and second chambers, an annular groove disposed in said concave surface parallel to the periphery of said surface and spaced inwardly from said periphery, a first plurality of openings coupling said first chamber to said concave surface, a second plurality of openings coupling said second chamber to said annular groove and a plurality of grooves coupling said first openings to said annular groove.

18. A gas bearing comprising a body having a concave spherical bearing surface, first, second, and third chambers, a first annular groove disposed in said concave surface parallel to the periphery of said surface and spaced apart from said periphery, a second annular groove concentric with said first annular groove and spaced inwardly therefrom, a first plurality of openings coupling said first chamber to said concave surface, a second plurality of openings coupling said second chamber to said second annular groove, a plurality of grooves coupling said first openings to said second annular groove and a third plurality of openings coupling said third chamber to said first annular groove.

19. A gas bearing comprising a body having a chamber therein, a concave spherical bearing surface, an annular groove disposed in said concave surface parallel to the periphery of said surface and spaced apart from said periphery and a plurality of openings coupling said chamber to said annular groove.

20. A gas bearing comprising a body having a chamber therein, a concave spherical bearing surface, an annular groove disposed in said concave surface parallel to the periphery of said surface and spaced apart from said periphery, a centrally disposed opening coupling said chamber to said concave surface and a plurality of radial grooves disposed in said surface coupling said opening to said annular groove.

21. A gyroscopically stabilized system comprising a main frame rotationally supported from a vehicle but adapted normally to remain approximately rotationally fixed in space, an intermediate frame mounted on said main frame for rotation about a given axis, a rotor, means rotatably supporting said rotor relative said intermediate frame and affording said rotor at least two degrees of freedom of tilting of its axis, said supporting means comprising a plurality of pairs of separate gas bearing pads, the gas bearing pads of each of said pairs being disposed in opposed axial relation, said rotor having bearing means disposed in coactive association with the gas bearing pads of each of said pairs, the axes of said pairs being disposed in coincidence with corresponding center lines of opposed faces of an imaginary regular polyhedron and means associated with said intermediate frame to supply gas to said bearings; means for steadily rotating both said rotor and said intermediate frame with respect to said main frame whereby precessional drifts are continually neutralized and servo means for tilting said main frame in such a direction as to reduce any misalignment of said given axis and rotor axis.

22. A gyroscope comprising a frame, a rotor, means rotatably supporting said rotor relative said frame, said supporting means comprising a plurality of separate gas bearing pads, said rotor having bearing means disposed in coactive association with each said gas bearing pad, the axis of each said gas bearing pad being disposed in coincidence with the corresponding perpendicular lines to a surface of an imaginary regular polyhedron which passes through the center of said polyhedron and means associated with said frame to supply gas to said bearings, all said axes if extended meeting at the center of said rotor.

References Cited in the file of this patent

UNITED STATES PATENTS

| | | |
|---|---|---|
| 1,385,423 | Bibbins | July 26, 1921 |
| 2,695,199 | Blizzard | Nov. 23, 1954 |
| 2,710,234 | Hansen | June 7, 1955 |
| 2,729,106 | Mathiesen | Jan. 3, 1956 |

FOREIGN PATENTS

| | | |
|---|---|---|
| 896,233 | France | Feb. 15, 1945 |
| 848,574 | Germany | Sept. 4, 1952 |